United States Patent [19]

Daniels et al.

[11] Patent Number: 4,964,340
[45] Date of Patent: Oct. 23, 1990

[54] OVERLAPPING STAGE BURN FOR MULTISTAGE LAUNCH VEHICLES

[75] Inventors: Mark H. Daniels; Jack Funk, both of Houston; Wyendell B. Evans, Friendswood; Christopher C. Varner, Houston, all of Tex.

[73] Assignee: Space Services, Incorporated, Houston, Tex.

[21] Appl. No.: 254,601

[22] Filed: Oct. 7, 1988

[51] Int. Cl.$^5$ .................................... B64G 1/40
[52] U.S. Cl. .................................. 102/377; 244/172; 60/225; 60/250; 60/263
[58] Field of Search .................. 244/172, 58, 63, 74, 244/3.21, 3.22; 60/225, 243, 250, 256, 263; 102/374, 377, 378

[56] References Cited

U.S. PATENT DOCUMENTS

| | | | |
|---|---|---|---|
| 2,745,347 | 5/1956 | Lightbody et al. | 102/377 |
| 2,748,703 | 6/1956 | Goss et al. | 102/377 |
| 2,787,218 | 4/1957 | Anthony | 102/377 |
| 2,899,898 | 8/1959 | Goss | 102/377 |
| 2,960,034 | 11/1960 | Besserer, Jr. | 102/377 |
| 3,023,570 | 3/1962 | Crouch | 60/255 |
| 3,122,098 | 2/1964 | Glennan | 102/378 |
| 3,128,600 | 4/1964 | Oldham | 60/256 |
| 3,190,221 | 6/1965 | Gariboldi | 60/250 |
| 3,210,930 | 10/1965 | Leeper et al. | 60/247 |
| 3,210,931 | 10/1965 | Elzufon et al. | 60/263 |
| 3,324,795 | 6/1967 | Miles et al. | 102/289 |
| 3,328,962 | 7/1967 | DeFeo et al. | 60/255 X |
| 3,357,187 | 12/1967 | Whitlock | 60/250 |
| 3,397,539 | 8/1968 | Schubert | 60/250 |
| 3,442,084 | 5/1969 | Dilchert et al. | 60/250 |
| 3,712,240 | 1/1973 | Donlon | 104/292 |
| 4,157,788 | 6/1979 | Canfield et al. | 244/3.22 |
| 4,384,690 | 5/1983 | Brodersen | 244/3.22 |
| 4,451,017 | 5/1984 | Marshall | 244/63 |
| 4,471,926 | 9/1984 | Steel, III | 244/172 X |
| 4,736,583 | 4/1988 | Hudema et al. | 60/225 |
| 4,796,839 | 1/1989 | Davis | 244/172 |
| 4,834,324 | 5/1989 | Criswell | 244/160 |

OTHER PUBLICATIONS

Design Status of the American Rocket Co. Industrial Launch Vehicle (ILV) Family, James R. French and Michael D. Griffin, Feb. 1988, Presented at First Annual Utah State University Conference on Small Satellites, Logan, Utah 10/7-9/87.

American Rocket Co. Industrial Launch Vehicle One Description, May 1987, News Release.

Excerpt from Customer Handbook dated Dec. 1987 and entitled "Titan III Commercial Launch Services", of Martin Marietta-Commercial Titan, Inc., P.O. Box 179, Denver, Colorado 80201, Sections 1 and 2.

Excerpt from the Illustrated Encyclopedia of Space Technology, K. Gatland, inside front and back cover sections, Harmony Books, a division of Crown Publishers, Inc., N.Y., N.Y., 1984.

*Aviation Week and Space Technology*, "Low-Cost Satellite Launcher Developed", Sep. 12, 77, pp. 42–47 (OR-TAG).

Aviation Week & Space Technology, McGraw-Hill Publ., Mar. 9, 1987, pp. 158–161.

*Primary Examiner*—Charles T. Jordan
*Assistant Examiner*—Michael J. Carone
*Attorney, Agent, or Firm*—Venable, Baetjer and Howard

[57] ABSTRACT

The invention relates to a multistage launch vehicle and method of multistage launch vehicle operation in which at least one subsequent motor stage is ignited following lift-off in partially overlapping relationship with its immediately preceding motor stage prior to shut-down and staging of the preceding motor stage in order to effect positive thrust control over the launch vehicle throughout shut-down and staging of the preceding motor stage. Preferably, each of the motors comprising the subsequently fired motor stage is provided with a thrust profile in which maximum thrust is attained prior to staging of the preceding stage.

60 Claims, 7 Drawing Sheets

| PERFORMANCE ANALYSIS OF SELECTED CASTOR IVA-BASED LAUNCH VEHICLES | | | | |
|---|---|---|---|---|
| | ILV BASELINE | SSLV ALTERNATE 1 | SSLV ALTERNATE 2 | SSLV BASELINE |
| PAYLOAD WEIGHT (LBM)* | 418 | 1000 | 1319 | 1573 |
| MAX. AXIAL ACCELERATION (G) | 11.5 | 7.5 | 8.8 | 7.0 |
| PARALLEL STAGE MOTOR CONFIGURATION | ○○○ | ○○○○○ | ○○○○○○○○ | ○○○○○○○ |
| STAGE 1<br>STAGE 2<br>STAGE 3<br>STAGE 4 | 2 CASTOR IVA's<br>1 CASTOR IVA<br>+1 STAR 48B<br>---- | 2 CASTOR IVA's<br>2 CASTOR IVA's<br>1 CASTOR IVA<br>+1 STAR 48B | 4 CASTOR IVA'S<br>2 CASTOR IVA's<br>1 CASTOR IVA<br>+1 STAR 37FM | 4 CASTOR IVA's<br>2 CASTOR IVA's<br>1 CASTOR IVA<br>+1 STAR 48B |

*PAYLOADS TO 400nm POLAR ORBIT
+MOUNTED SERIALLY OVER CORE MOTOR

FIG. 8

OVERLAPPING STAGE BURN FOR MULTISTAGE LAUNCH VEHICLES

BACKGROUND OF THE INVENTION

1. Field of Invention

The invention relates generally to the aerospace industry, and more particularly to the launching of payloads into orbit around the earth. In particular, the invention relates to a launch vehicle and a method of launch vehicle operation for deploying a satellite into a predetermined orbital path around the earth.

2. Description of the Related Art

Launch vehicles for delivering payloads such as satellites into earth orbit have become increasingly important as the communications industry has increased its reliance upon satellite-based communication systems. As a result of this increased reliance on satellite-based communication systems, a variety of launch vehicles have been implemented in an effort to deliver satellites into earth orbit. However, these launch vehicles have not proven to be entirely satisfactory for reasons of reliability, cost of manufacture, and the availability of necessary components. It is for all these reasons that the launch vehicle and method of launch vehicle operation of the present invention were developed.

The design and operation of a launch vehicle is, to a large extent, dictated by the size of the payload to be carried and the orbit to which the payload is to be delivered, the location of the launch site, and the cost and availability of parts for constructing the launch vehicle. Early satellite launch vehicles employed a "series" stage configuration in which a number of successively-ignitable rocket stages were stacked one on top of another. The term "rocket stage" as used throughout this disclosure refers to the discrete, simultaneous firing and operation as a group of one or more rocket motors until engine shut-down. In series configured launch vehicles, a prior, burn-out stage is jettisoned from the launch vehicle, usually with the aid of pyrotechnic devices such as explosive bolts, prior to ignition of a successive stage.

Early preference for the series stage configuration for launching commercial payloads such as satellites stems to a large extent from the familiarity of launch vehicle frameworkers and designers with series stage configurations resulting from work on predominantly military-oriented launch projects. However, the design criteria for a military project, which tend to dictate a series stage configuration, influence the design of a commercial launch vehicle to a much lesser extent. For example, design parameters such as maximum vehicle width, which are of considerable importance for military projects involving launchings from subterranean launch sites such as missile silos, are less critical for commercial launch vehicles. Additionally, there is less of a need in a commercial context to skew in a direction of absolute performance the relative equilibrium between performance and cost of manufacture. Instead, the balance in a commercial context is directed more toward the side of cost-effectiveness of the launch procedure and the launch apparatus. For these reasons, parallel rather than series rocket engine configurations have gained increasing acceptance.

In a parallel rocket engine configuration, two or more rockets are placed in a side-by-side (rather than vertical) configuration, resulting in a launch vehicle which is generally wider, but shorter in height, than is a series configuration of similar propulsive capabilities. The parallel configuration is particularly advantageous in a commercial context because it provides for a greater degree of payload flexibility by allowing for a relatively wide range of payloads by simply changing the number of "strap-on" rocket motors assembled to a central or core stage of the launch vehicle. The generally shorter, wider configuration of the parallel arrangement of rocket motors also results in a launch vehicle which exhibits a considerable degree of both static and dynamic stability over its series counterpart. A further advantage is provided by the near collocation of the vehicle center of gravity and its thrust and aerodynamic centers. As a result of this near collocation of center points, the parallel configuration rockets tend to be more readily controllable, even in the absence of external fin augmentation.

In spite of the seemingly great operational advantages afforded by a parallel rocket configuration over its series counterpart, serious operational and cost deficiencies nevertheless exist with current parallel configuration launch vehicles. For example, one known parallel configuration launch vehicle employs as its first stage a pair of specially designed and constructed solid fuel rocket motors which carry the launch vehicle beyond the earth's sensible atmosphere before the second stage is ignited. While this rocket affords a tremendous payload capacity of on the order of 40,000 lbs. for deployment into a low earth orbit of generally no more than 300 nautical miles for a range of orbital inclinations, it is not well suited for transporting considerably smaller payloads such as small to medium-sized communication satellites, which typically range in weight from about 150 lbs. to about 3,500 lbs., for deployment at lower polar earth orbits, typically from about 100 nautical miles to about a 450 nautical miles above the earth's surface. As used throughout this disclosure, the term "polar orbit" is meant to refer to an orbital path around the earth that is inclined with respect to the earth's equator at an angle of about 90°. This known launch vehicle is therefore quite limited in the range of payload weights it can efficiently deliver into earth orbit, as it was designed specifically for transporting relatively heavy, bulky payloads. In view of the specific and narrowly defined operational and mission objectives around which this known launch vehicle was designed, one cannot readily adapt this known, large capacity launch vehicle to carry much lesser weight payloads to typically closer proximity earth orbits, especially low altitude polar earth orbits, for the vehicle and its rocket engines were not designed and constructed to account for these operational parameters.

In another known parallel configuration launch vehicle, nine solid "strap-on" rocket motors are positioned along the circumference of a high output liquid burning first stage core engine. Six of the solid rocket motors, along with the liquid core engine, are ignited at lift-off in order to raise particularly heavy payloads from the ground. Because the solid rocket motors are provided principally to assist in the initial launching of the launch vehicle from the ground, they have a relatively short burn life of on the order of about fifty seconds, after which they are jettisoned from the continuously burning liquid core stage. Following jettisoning of the six "strap-on" motors, the remaining three solid rocket motors are ignited while the vehicle is in flight in order to further augment the thrust output of the continuously burning liquid engine, and are burned to completion and thereafter jettisoned. Thereafter, the launch vehicle operates as a conventional series configuration multistage rocket in the manner set forth above.

In view of the foregoing, it is clear that there exists a need for an expendable launch vehicle which is readily reconfigurable to deliver a variety of different size payloads inexpensively and reliably into a range of earth orbits. Accordingly, it is an object of the present invention to provide a launch vehicle and method of launch vehicle operation for delivering relatively light payloads such as one or more satellites into earth orbit in as reliable and cost-effective a manner as is possible.

Another object of the present invention is to provide a launch vehicle and method of launch vehicle operation which utilizes, to as large an extent as possible, proven launch vehicle components for delivering a payload into earth orbit.

Yet another object of the present invention is to provide a launch vehicle and method of launch vehicle operation which is readily adaptable to carry payloads of a variety of different weights into a range of orbital configurations around the earth.

Yet still another object of the present invention is to provide a launch vehicle and method of launch vehicle operation which includes a plurality of rocket engine stages arranged in a parallel configuration that is adaptable to a wide range of payload capacities for delivery into one of a variety of different earth orbits.

Still yet another object of the present invention is to provide a parallel configuration, multistage launch vehicle and method of launch vehicle operation which provides improved dynamic stability and enhanced vehicle control up to deployment of a payload such as a satellite into earth orbit.

A further object of the present invention is to provide a parallel configuration, multistage launch vehicle and method of launch vehicle operation which eliminates the need for a reaction control system to provide attitude control during operation of the early stages of the launch vehicle.

Yet a further object of the present invention is to provide a parallel configuration, multistage launch vehicle and method of launch vehicle operation which employs for its lower stages substantially similar rocket motors and related equipment to provide a greater degree of commonality of design than has previously been achieved in the aerospace industry.

These and other objects and advantages of the present invention will become apparent from a reading of the detailed description below in conjunction with the accompanying drawings.

SUMMARY OF THE INVENTION

A multistage launch vehicle and method of launch vehicle operation is provided in which motors of two or more rocket stages are sequentially ignitible in partially overlapping relationship while the launch vehicle is within the earth's atmosphere. In a preferred aspect of this embodiment, the motors of the first and second rocket stages are mounted parallel to one another. Preferably, the first stage is comprised of two or more diametrically-opposed pairs of rocket motors having substantially similar thrust profiles. At least one pair of the first stage rocket motor pairs is provided with a control system for controlling launch vehicle yaw and pitch. Preferably, the motor of the second stage is ignitible within about five seconds of first stage rocket motor shut-down or burn-out in order to provide enhanced positive thrust control during staging (jettisoning) of the first stage.

In a preferred aspect of the invention, the second stage includes at least one diametrically-opposed pair of rocket motors, and rocket motors of the first and second stages have substantially similar thrust profiles which exhibit a generally linear rate of thrust diminution following attainment of maximum thrust until motor shut-down. Maximum thrust is preferably developed within about five seconds of motor ignition in order to maximize performance of the launch vehicle and stabilize the vehicle during staging of the lower stage.

The launch vehicle preferably includes a payload deploying system for effecting deployment of a payload into orbit around the earth ranging from about a 100 nautical mile low earth orbit to a geosynchronous orbit of about 19,365 nautical miles above the earth's surface, or higher. The payload optimally has a weight at sea level of from about 150 lbs. to about 3,500 lbs. and can comprise one or more separately-deployable objects such as satellites.

In another preferred embodiment of the invention, there is provided a launch vehicle comprising three parallel rocket motor stages, each stage having at least one rocket motor, and apparatus for sequentially igniting in partially overlapping relationship the motors of the second stage with the motors of the first stage, and the motors of the third stage with the motors of the second stage. The apparatus for sequentially igniting the motors of the second stage is arranged to and while the launch vehicle is within the earth's atmosphere. The first rocket motor stage is comprised of at least two pairs of diametrically-opposed pairs of rocket motors positioned around the third rocket motor stage. Preferably, all of the first stage rocket motors have substantially similar thrust profiles. At least one pair of the first stage rocket motors also preferably includes apparatus for controlling launch vehicle yaw and pitch.

In a further preferred aspect of the three-stage launch vehicle, the second stage comprises at least one pair of rocket motors having substantially similar thrust profiles and apparatus for controlling launch vehicle yaw and pitch. The third stage is preferably comprised of a single rocket motor. Preferably, all of the rocket motors of the first, second and third stages are solid rocket motors having substantially similar thrust profiles. The rocket motor thrust profiles are preferably arranged to develop a peak thrust of about 130,000 lbs. within about five seconds following motor ignition. The third stage motor is arranged to be ignited within about 3 seconds to about 5 seconds prior to burn-out of the second stage motors and to develop its peak thrust just prior to staging of the second stage. A fourth stage serially mounted over the third stage can optionally be provided for boosting a satellite or other payload into a predetermined orbital path around the earth or outwardly from the earth. A reaction control system can optionally be provided to control launch vehicle roll. A reaction control system is preferably operational during operation of the third stage motor and during the coast phase following third stage motor burn-out to control launch vehicle roll and to assist in obtaining proper vehicle attitude prior to separation of the third and fourth stages.

Another embodiment of the invention provides a method for operating a launch vehicle having at least first and second rocket motors stages in which each of the stages comprises at least one solid fuel rocket motor. The method comprises the step of (a) igniting the rocket motor comprising the first stage and operating the motors continuously until burn-out; (b) prior to first stage motor burn-out, igniting the motors comprising the second stage in overlapping relationship with the first stage motors so as to maintain positive thrust control over the launch vehicle as the first stage motors burn-out; and (c) exerting directional control over the launch vehicle during burn-out of the first stage motors. Preferably, the first stage is jettisoned following burn-out of its rocket motors.

In a further preferred aspect of the method of operation, the rocket motors comprising the second stage are ignited from about three seconds to about five seconds prior to burn-out of the first stage rocket motors, and maximum engine thrust is developed within about five seconds following motor ignition. The rocket motors of the first and second stages are preferably operated at a generally linearly diminishing thrust rate following attainment of maximum thrust until motor burn-out.

Another preferred aspect of the method of launch vehicle operation, in which the second stage comprises at least two rocket motors operable to provide substantially similar thrust profiles, provides that the second stage rocket motors are ignited substantially simultaneously and in partially overlapping relationship with the first stage rocket motors, subsequent to vehicle lift-off and preferably while the launch vehicle is within the earth's atmosphere. In instances where a third rocket motor stage is provided, the method further comprises the step of igniting the third stage rocket motor in partially overlapping relationship with the second stage rocket motors so as to maintain positive thrust control over the launch vehicle as the second stage rocket motors burn-out. Preferably, each of the burnt-out rocket motor stages is jettisoned following burn-out.

The invention further comprises a method for deploying a satellite into orbit around the earth in which the satellite is deployable from a launch vehicle having first and second sequentially-ignitable, parallel-mounted rocket motor stages, each of the stages being comprised of at least one solid fuel rocket motor, in which the method comprises the steps of (a) igniting the one or more motors of the first stage and operating them continuously until engine burn-out; (b) prior to first stage motor burn-out, igniting the one or more motors of the second stage in partially overlapping relationship with the first stage rocket motors so as to maintain positive thrust control over the launch vehicle as the first stage rocket motors burn-out; (c) deploying the satellite into a desired orbital path around the earth; and (d) exerting directional control over the launch vehicle until satellite deployment. In a preferred method of operation, the rocket motors comprising the second stage are ignited from about three seconds to about five seconds prior to burn-out of the first stage rocket motors, and the first stage is jettisoned following burn-out of its motors. Preferably, the motors of the first and second stages are operated to develop maximum thrust within about five seconds following motor ignition, and are operated at a generally linearly diminishing thrust rate thereafter until motor burn-out.

A further preferred aspect of the method for deploying a satellite provides for satellite deployment by a separate booster rocket which transports the satellite to a desired orbital path prior to separation from the satellite.

DETAILED DESCRIPTION OF THE PREFERRED EMBODIMENTS

Figures 1, 2:
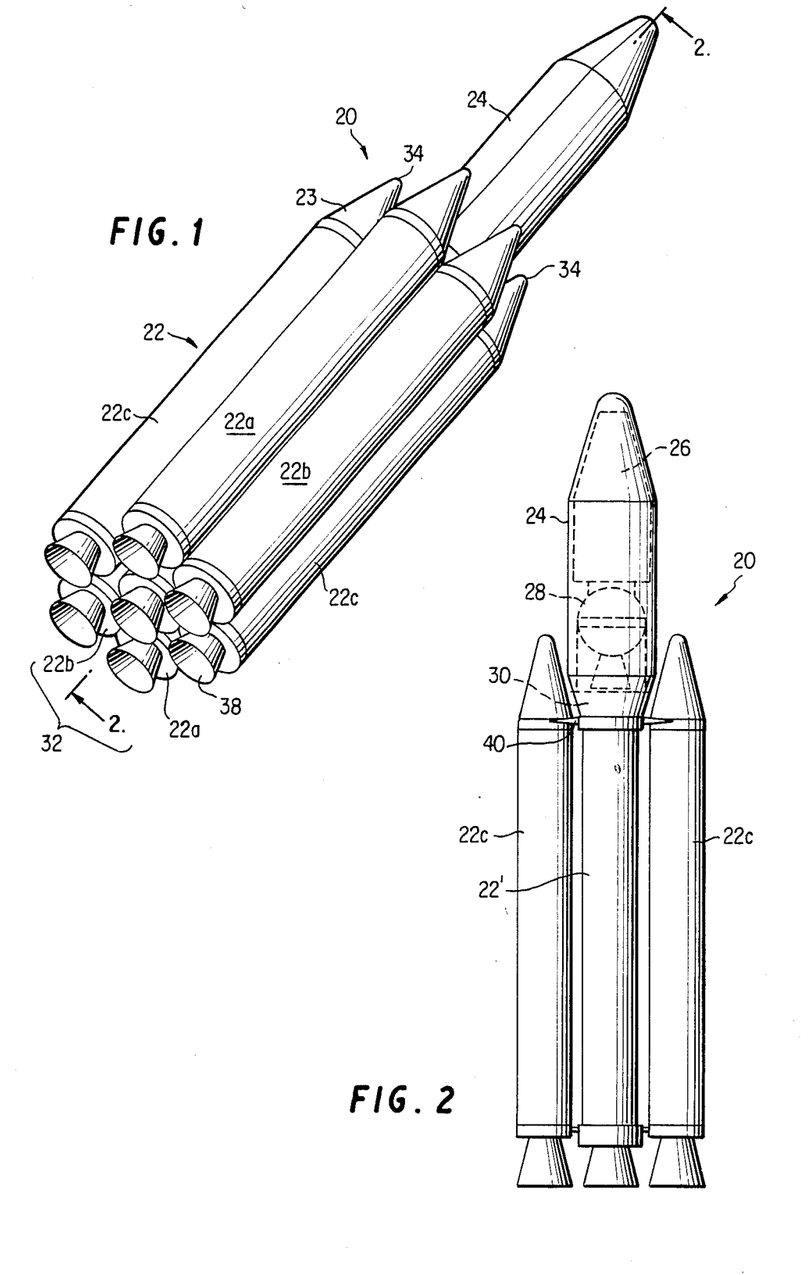
FIG. 1 is a perspective view of a launch vehicle in accordance with the invention.
FIG. 2 is a view along the line 2—2 of the launch vehicle depicted in FIG. 1.

With reference to FIGS. 1 and 2, there is depicted a launch vehicle 20 in accordance with the present invention. The launch vehicle 20 includes a plurality of modular "strap-on" rockets 22 arranged in a generally annular configuration around a centrally-mounted "core" booster rocket, designated by reference numeral 22'. With the exception of the core motor 22', the upper portion of each rocket 22 is provided with an aerodynamic fairing (nose cone) 23. The centrally-mounted rocket 22' supports a shroud 24 which houses and protects a payload 26, a booster stage 28 for deploying the payload 26 into a desired orbital configuration around the earth, and an interstage unit 30 containing the vehicle's avionics and related control systems for operation of each of the rockets 22. Details of each of the components carried within the shroud 24 are described in greater detail below.

In a preferred aspect of the invention, the rockets 22 are arranged in a plurality of parallel stages. Preferably, three stages of strap-on rockets are provided. The first stage 32 includes two pair of diametrically-opposed strap-on rockets 22a and 22b. The second stage 34 includes one pair 22c of diametrically-opposed rockets. The third stage 36 or core unit is comprised of the centrally-mounted rocket 22' and is circumscribed by the rockets 22a, 22b and 22c of the first and second stages 32, 34, respectively. Each of the rockets 22 is generally conventional in structure and, as such, permits the assembly of a "modular" launch vehicle from like component "building blocks" that can be specifically adapted to a particular payload and orbital path by simply adding or subtracting one or more rockets 22 as may be appropriate for each of the stages of the launch vehicle.

For reasons of cost-containment and ease and safety of storage and handling, the rockets 22 preferably comprise solid fuel rocket motors which deliver their thrust from the rocket body through a rocket nozzle 38 positioned at the lower end of each rocket. However, liquid fuel rocket engines can be substituted for the solid fuel motors, if desired. The nozzles 38 of at least one diametrically-opposed pair of rockets of the first stage 32, such as rocket pair 22a, is provided with suitable means such as a gimballing structure for controlling yaw, pitch and optionally roll of the launch vehicle during its ascent through the atmosphere. Both of the second stage booster nozzles 38 and the nozzle 38 of the single third stage 36 or core motor are provided with similar yaw, pitch and roll control apparatus. Such yaw, pitch and roll control apparatus are also known in the industry as thrust vector control (TVC) apparatus. Only one pair of the two pair of diametrically-opposed rockets 22 of the first stage 32 is provided with thrust vector control in order to avoid unnecessary expense and because satisfactory vehicle control is achieved through the use of thrust vector controlled nozzles in the manner described. Furthermore, the rocket motors for each pair of rockets, and the rocket motors for each stage, can be selected from stock in accordance with such factors as date of propellant mix and pour so as to provide the most optimal matching of motor performance for the rockets comprising each stage to further facilitate control of the launch vehicle. Both of the second stage rocket motors 22c, along with the single motor 22′ comprising the third stage 36, are provided with thrust vector control to provide proper control authority for these respective stages.

Figure 3A:
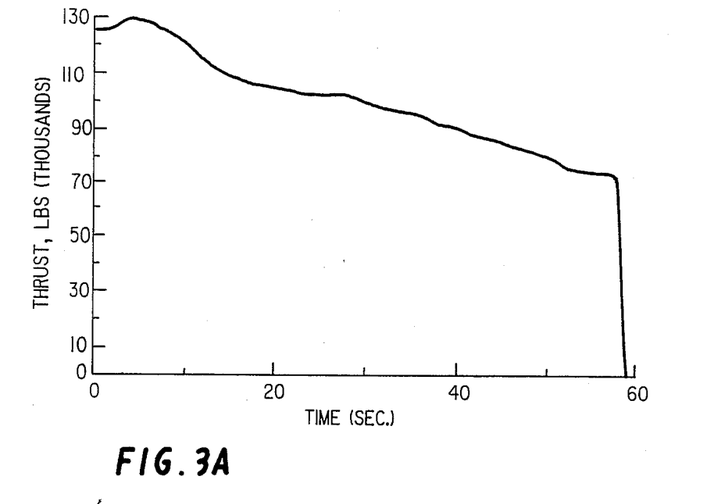
FIGS. 3A and 3B are thrust profiles for the modular rocket engine used in several rocket engine stages of the present invention and that of a known rocket engine, respectively.

With reference to FIG. 3A, there is shown the optimal thrust profile for each of the rocket motors of the first, second and third stages 32, 34 and 36. The presently preferred rocket motor for these three stages for use with the launch vehicle 20 of the present invention is the Castor IVA solid fuel rocket motor, manufactured by the Huntsville, Ala. division of Morton Thiokol, Inc., located at Chicago, Ill., U.S.A. The Castor IVA rocket motor is preferred because it represents the most advantageous combination of performance, payload-carrying capacity, cost, and ready availability. Other rocket motors, such as motors employing graphite epoxy and other composite composition motor casings, and hybrid liquid-solid motors that are currently being developed by a variety of manufacturors, may also be adapted for use in the present launch vehicle if and when they become readily available on a cost-effective basis.

Figure 3B:
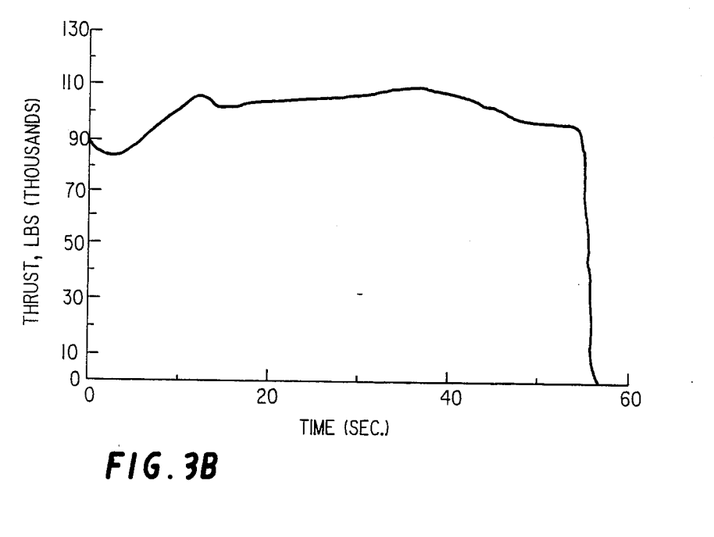

When the Castor IVA is configured to operate with the depicted thrust profile, the optimal combination of net vehicle thrust, payload carrying capacity and other launch vehicle criteria are obtained. The depicted thrust profile provides for rapid attainment of maximum thrust within about five seconds following motor ignition. Thereafter, the thrust of the motor diminishes generally linearly at a rate of about 1,000 lbs. per second until motor burn-out approximately 58 seconds following ignition. In contrast, the thrust profile for a conventional Castor IVA rocket motor, as shown in FIG. 3B, develops a peak thrust of about 107,000 lbs. considerably later in time, nearly fifteen seconds following ignition. Rapid thrust development is an important operational aspect of the motors of the launch vehicle of the present invention, for this feature facilitates vehicle control during burn-out of prior stage rocket motors and during the staging (jettisoning) of burnt-out rocket motor stages in the manner described in detail below. The generally linearly diminishing thrust rate is desirable, for it provides a steady rate of acceleration as the launch vehicle burns its fuel, resulting in enhanced vehicle controllability and payload accommodation.

The rockets 22 are coupled to the central, core motor 22′ by a coupling mechanism 40 which provides for selectively disengagable coupling of the rockets 22a, 22b and 22c of the first and second stages, 32 and 34, respectively, with respect to the third stage motor 22′.

Figure 4:
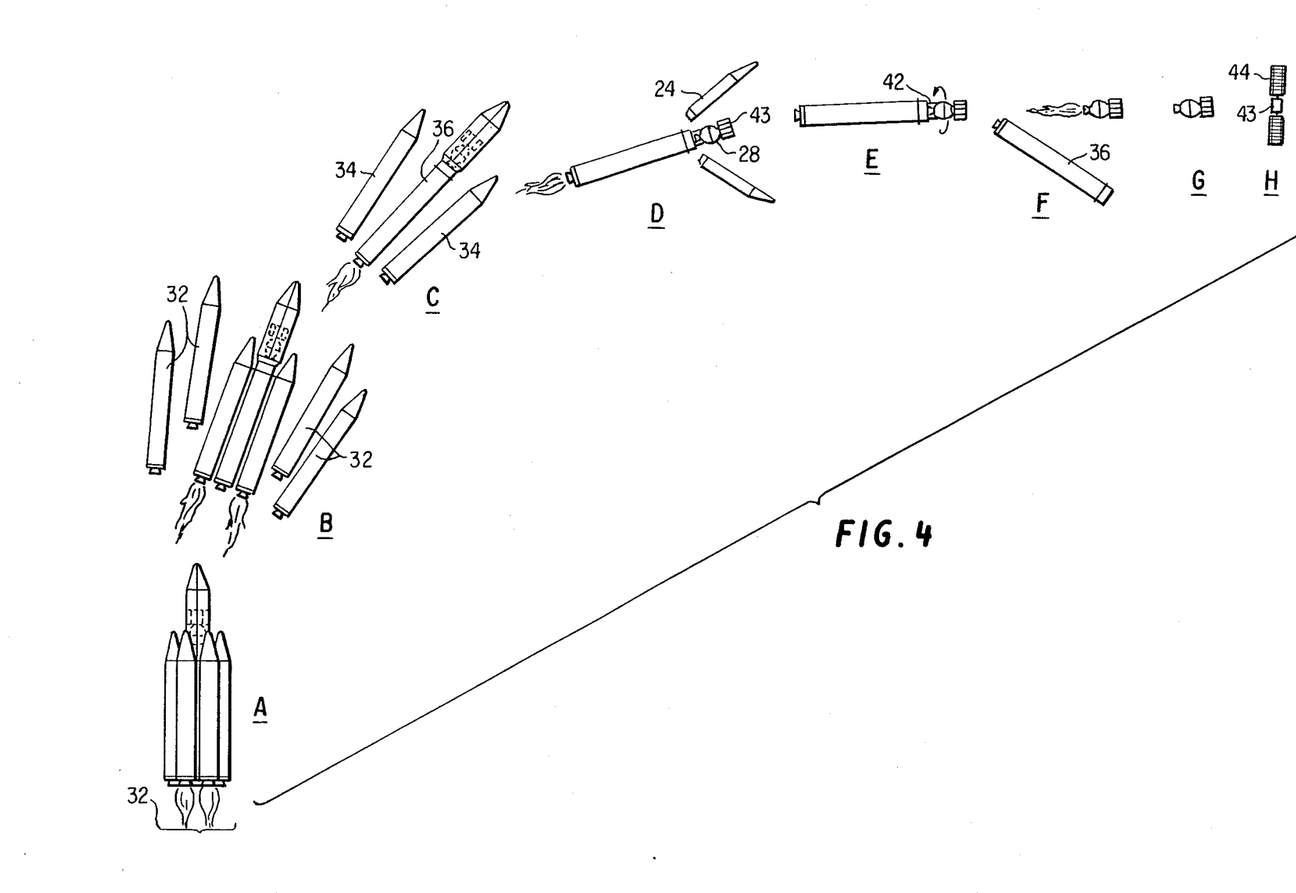
FIG. 4 is a schematic representation of various phases of operation of the launch vehicle of FIG. 1.
Figure 5:
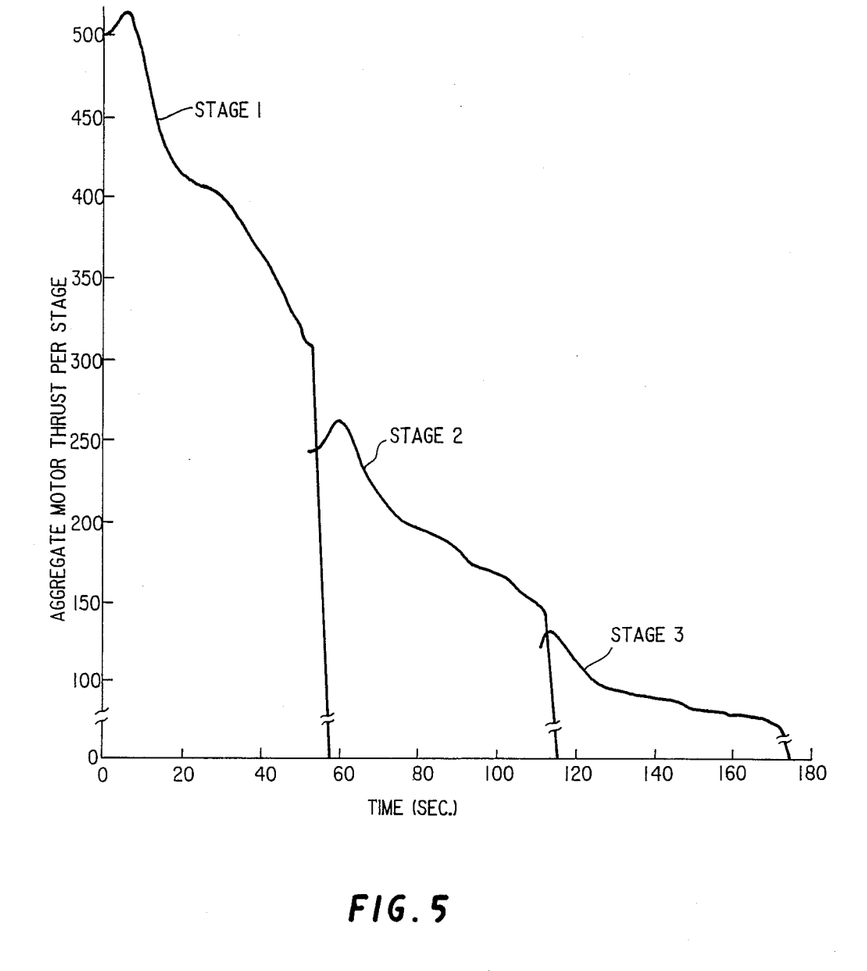
FIG. 5 is a graph relating aggregate motor thrust per rocket engine stage.
Figure 6:
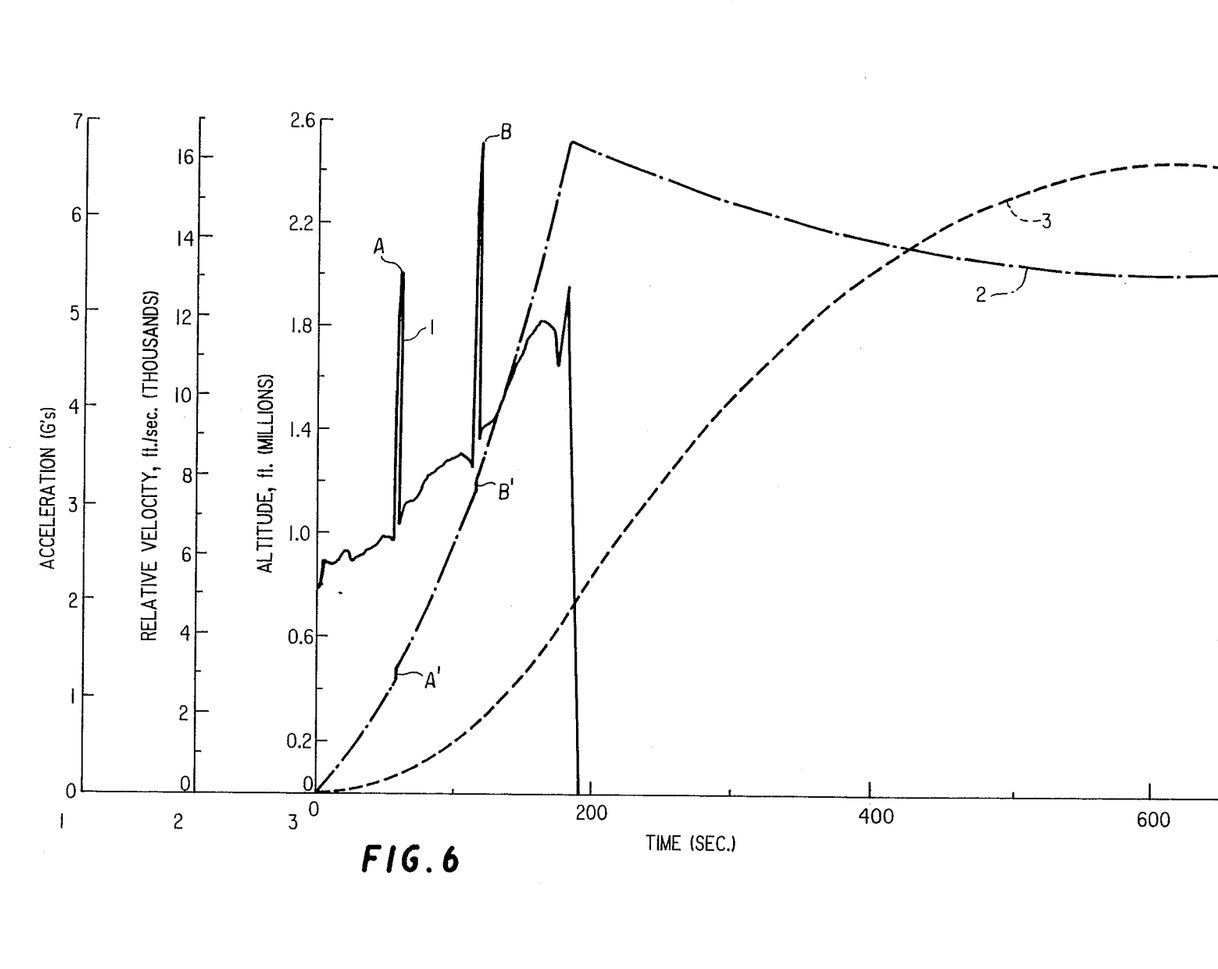
FIG. 6 is a graphical depiction of launch vehicle acceleration, relative velocity and altitude.

With references to FIGS. 4 through 6, there is shown in schematic and graphic form the sequence of events from vehicle lift-off to satellite deployment. At vehicle lift-off, designated at section A of FIG. 4, only the first stage motors 22a and 22b of the launch vehicle 20 are ignited. The four motors of the first stage 32 are ignited simultaneously by ground control and are operable to provide for rapid acceleration of the launch vehicle from the ground. As the first rocket motor stage 32 comprises four rocket motors 22, the thrust developed by this stage, as shown in FIG. 5, is the greatest of the three solid rocket motor stages. First stage thrust peaks at about 520,000 lbs. within about five seconds following motor ignition, and tapers off generally linearly at an aggregate (stage) rate of approximately 4,000 lbs. per second until motor burn-out. Approximately 3 to 5 seconds prior to burn-out of the first stage rocket motors 22a and 22b, the pair of second stage rocket motors 22c is ignited. As a result of ignition of the second stage rocket motors prior to complete burn-out of the motor pairs 22a and 22b of the first stage (i.e., operation of the first and second stages' motors in partially overlapping relationship) and the provision of thrust vector control for the second stage motors, vehicle controllability is enhanced throughout first stage motor burn-out, as thrust vector control is momentarily provided by both the first stage rockets 22a and second stage rockets 22c. The first stage rocket motors are preferably jettisoned following burn-out, as shown in FIG. 4, section B, and during the initial few seconds of second stage motor operation so that the momentarily aerodynamically destabilizing process of staging is accomplished while the second stage rocket motors are operating at or near maximum thrust. Because staging of the first stage occurs within the atmosphere, separation of the first stage rockets 22a and 22b is simplified, as the jettisoned rockets 22a and 22b are pulled away from the launch vehicle 20 by aerodynamic forces. As used throughout this disclosure, the term "atmosphere" refers to an altitude above the earth's surface of up to about 400,000 ft. Additionally, because staging occurs subsequent to second stage motor ignition, a smoother transition from first stage to second stage results, as dynamic vibration and aerodynamic pressure are minimized.

The graph in FIG. 6 depicting launch vehicle acceleration (Graph No. 1) indicates the seeming paradox that, while the thrust output of the stage one rocket motors is collectively diminishing over time, the launch vehicle nevertheless accelerates through the atmosphere, as the launch vehicle is provided with a generally linearly increasing velocity (Graph No. 2) relative to the earth. The reason for the ability of the launch vehicle 20 to increase in both relative velocity and rate of acceleration in spite of a diminishing thrust output of its first stage rocket motors is due to the fact that the launch vehicle 20 as a whole is becoming progressively lighter as the first stage rocket motors 22a and 22b burn their fuel supply. Because the first stage motors are still delivering thrust at the time the second stage rocket motors 22c are ignited, a sharp upward spike, depicted at "A" in Graph No. 1, occurs in the acceleration graph, as the launch vehicle is subjected to the collective thrust output of the first and second stage rocket motors 22a, 22b and 22c. The sudden acceleration imparted to the launch vehicle 20 as a result of the overlapping ignition of the second stage motors 22c with the first stage motors 22a and 22b results in a corresponding sharp increase in relative vehicle velocity, as noted at the portion designated "A'" in the relative velocity graph (Graph No. 2). By the time the first stage rocket motors completely exhaust their fuel supply, nearly 58 seconds following engine ignition, the collective thrust output of the second stage rocket motors 22c is increasing and the launch vehicle is continuing to accelerate and increase in relative velocity and altitude, as shown in Graph Nos. 1, 2 and 3 of FIG. 6.

The second stage rocket motors 22c are preferably solid rocket motors having thrust profiles substantially similar to the thrust profiles of each of the first stage rocket motors 22a and 22b. As a result of this arrangement, maximum second stage motor thrust is developed within about five seconds following second stage motor ignition, and tapers off generally linearly at a rate of about 1,000 lbs. per second for each motor until burn-out. However, because the launch vehicle is progressively decreasing in weight as the second stage rocket motors 22c burn their fuel supply, and because the launch vehicle 20 is operating in a progressively thinner atmosphere as it continues to ascend, the launch vehicle continues to accelerate and increase its relative velocity in the manner depicted in FIG. 6.

Just prior to burn-out of the second stage rocket motors 22c, the single third stage core motor 22' is ignited so that the third stage rocket motor 22' is operated in partially overlapping relationship with the second stage rocket motors 22c. The onset of third stage rocket motor ignition is accompanied by a sharp and sudden increase in launch vehicle acceleration, designated at "B" in Graph No. 1 and a sudden increase in relative velocity of the launch vehicle, designated at "B," in Graph No. 2 of FIG. 6. The second stage rocket engines 22c are preferably jettisoned after they have exhausted their fuel supply, as shown in section C of FIG. 4, to further reduce the weight of the launch vehicle.

In the preferred embodiment, sequential ignition of the second and third stages, along with jettisoning of the first and second stages, occur within the earth's atmosphere in order to enhance control of the launch vehicle and facilitate separation of the jettisoned stages in the manner described in detail above. With respect to the graphical data depicted in FIG. 6, it should be appreciated that the acceleration and relative velocity graph spikes, A and A', B and B', respectively, would be significantly greater, and therefore potentially destabilizing to the launch vehicle and possibly destructive to the payload, if sequential stage ignition and staging did not proceed in the manner provided by this invention. As aerodynamic and adverse structural forces are minimized as a result of the overlapping stage burn and staging processes described above, lighter weight, simpler structural components can be used in the construction of the launch vehicle than would otherwise be possible, thereby affording a greater payload carrying capacity and enhancing the overall cost-effectiveness of the launch vehicle. Further, because the launch vehicle is subjected to continuous, positive thrust throughout burn-out and staging of the first and second stage engines, positive attitude control of the launch vehicle can be maintained, even in the absence of a reaction control system. Elimination of the reaction control system for the first and second stages results in further cost and weight savings which enhance the performance of the launch vehicle.

The third stage rocket motor 22' is preferably a solid rocket motor having a thrust profile substantially similar to that depicted in FIG. 3A and to the thrust profiles for each of the second and first stage rocket motors. Although only a single third stage rocket motor is provided, the launch vehicle continues to accelerate due to its continuously diminishing weight and ascent through a progressively thinning upper atmosphere, as shown in FIG. 6. By the time the third stage rocket motor exhausts its fuel supply at nearly 200 seconds following lift-off, the launch vehicle is provided with a relative velocity of approximately 16,500 ft/sec, which is sufficient to carry the launch vehicle into the lower reaches of space.

Prior to burn-out of the third stage rocket motor 22', the launch vehicle 20 jettisons its shroud 24, as shown at section D of FIG. 4, to expose the interstage unit 30, fourth stage spin propulsion table 42, fourth stage 28 and its associated satellite payload 26. While only one satellite 26 is depicted, more than one satellite can be transported by the launch vehicle 20 so long as the aggregate weight of the satellites and any booster rockets provided therewith fall within the prevailing operational guidelines for the launch vehicle. Optimal payload capacity for the launch vehicle 20 ranges from about 150 lbs. to about 3,500 lbs. as measured before launch.

The fourth stage rocket motor is preferably a solid fueled rocket motor and is used to provide sufficient orbital velocity to circularize the payload at the desired orbital altitude. Prior to ignition of the fourth stage rocket motor, the spin table 42 rotates and ejects the fourth stage 28 and its associated payload 26 to a position clear from the third stage 36. Once the fourth stage 28 is a sufficient distance from the expired third stage, the fourth stage rocket motor is ignited to transport the payload 26, which is depicted in the form of a satellite 43, to its desired orbital path. Thereafter, the satellite separates from the fourth stage, deploys its solar panels 44 and orients itself in a proper orbital attitude. The satellite 43 is then free to be tested by both ground-based and self-contained testing programs and apparatus. The above-identified steps from fourth stage rotational ejection to satellite deployment are depicted schematically in FIG. 4, sections E–H. Ignition of the fourth stage motor 28 can be controlled by a sequence timer or other conventional control apparatus mounted on the fourth stage. A reaction control system can optionally be provided on the fourth stage 28 to further facilitate orbital insertion of the satellite 43.

Figure 7:
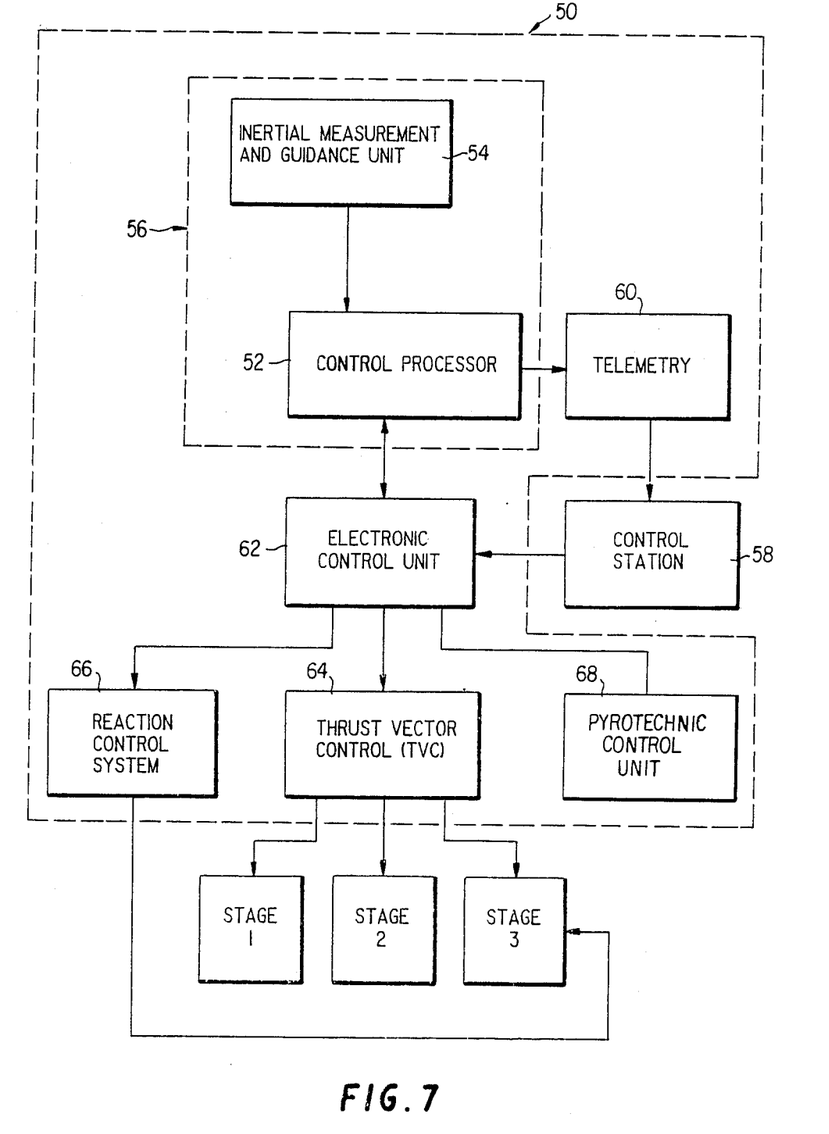
FIG. 7 is a diagrammatic representation of program control of the first three stages of the launch vehicle depicted in FIG. 1.

With reference to FIG. 7, there is shown in diagrammatic form the avionics system 50 of the interstage unit 30 and the flow of information through the avionics system 50 and each of the first, second and third stages of the launch vehicle 20. The avionics system is preferably a ring laser gyro unit, such as the Honeywell model H700-3A Ring Laser Gyro IGU manufactured by Honeywell, Inc. of Clearwater, Fla., U.S.A. As noted in the flow chart, the control processor 52 receives input from the inertial measurement unit 54 to compare the actual flight path as determined by the inertial measurement unit 54 with the flight plan stored in the control processor 52. The inertial measurement unit 54 and control processor 52 together constitute the launch vehicle's inertial guidance unit 56. Output from the inertial guidance unit 56 is sent both to the ground control station 58 by way of telemetry 60 for further processing, monitoring and evaluation and to the electronic control unit 62 for the purpose of implementing attitude and directional control changes to each of the first, second and third stages of the launch vehicle through the thrust vector control (TVC) 64. The electronic control unit 62 directs additional ouput to the reaction control system 66 and pyrotechnic control unit 68. The reaction control system 66 effects attitude changes in the launch vehicle prior to rotational ejection of the fourth stage 28. The pyrotechnic control unit 68 directs signal input to various pyrotechnic devices used for staging of individual rockets 22, shroud 24 separation and vehicle self-destruct. As a result of avionics system function in the manner described above, ground control is kept apprised of the operational status of the launch vehicle and can effect control changes therein as needed throughout the operation of the launch vehicle and deployment of its payload.

Figure 8:
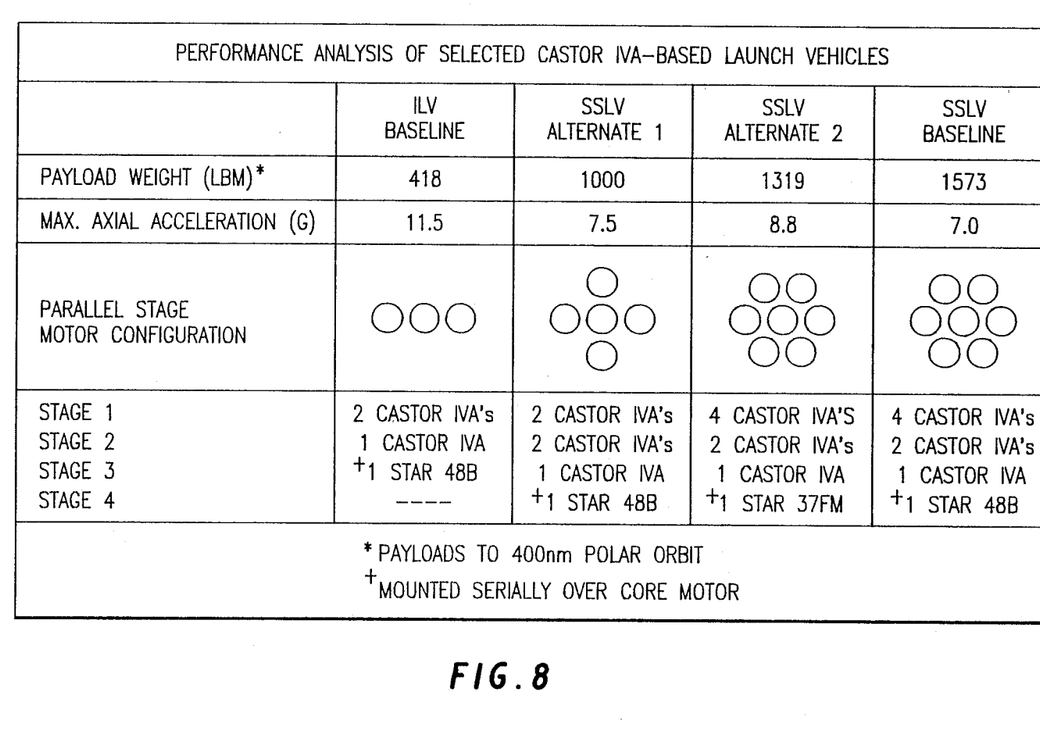
FIG. 8 is a table illustrating various launch vehicle configurations and capabilities.

The modular character of the lower stages of the launch vehicle facilitates launch vehicle reconfiguration in accordance with a variety of mission objectives, payload weights, and desired orbital paths. Four examples of different launch vehicles readily assembleable from stock parts is depicted in the table of FIG. 8. As is shown in FIG. 8, a launch vehicle having from four to eight rocket engines is readily assembleable for delivering various weight payloads to a standard 400 nautical mile polar orbit. In the three stage interim launch vehicle (Conestoga ILV) base-line configuration, the first and second rocket engine stages both comprise Castor IVA solid rocket motors. The Castor IVA rocket motor is especially desirable for use in the launch vehicle of the present invention because it is a launch proven, time tested and readily available stock rocket engine. The third and final stage of the ILV baseline configuration is a booster motor known as the STAR 48B, which is manufactured by Morton Thiokol. The STAR 48B is used to boost the satellite payload into a desired orbital path following expiration of the single, second stage Castor IVA engine.

The standard small launch vehicle (SSLV) Alternate One, Two and Baseline configurations are all four-stage launch vehicles. Each of the three stages for these launch vehicles is comprised of one or more Castor IVA solid rocket motors. Because the payload capacity of the SSLV Alternate One configuration is on the order of 1,000 lbs., only two Castor IVA motors are required for first stage operation. However, due to the greater payload capacities of the SSLV Alternate Two and Baseline configurations, four Castor IVA rocket motors are provided for first stage operation. In the Alternate Two configuration, a Morton Thiokol STAR 37FM solid booster is used for the fourth stage payload booster motor, whereas in the other SSLV and ILV configurations, a Morton Thiokol STAR 48B solid rocket booster motor is used. Of course, appropriate liquid engines can be substituted for the solid rocket payload booster motors, if desired. It can thus be readily appreciated from this table that increasingly heavy payloads can be delivered into a desired earth orbit by simply adding Castor IVA rocket motors to one or more of the stages of the launch vehicle. However, the practical limits of this modular or "building block" approach to launch vehicle construction are such that payloads of from about 150 lbs. to about 3,500 lbs. can be delivered into earth orbits from about a 100 nautical mile (polar) to a geosynchronous orbit of about 19,365 nautical miles above the surface of the earth, or higher.

While the invention has been described relative to specific embodiments, it is evident that modifications and changes may be made with regard thereto without departing from the scope of the invention.

What is claimed is:

1. A launch vehicle comprising first and second sequentially ignitible rocket motor stages, wherein each of said rocket motors stages is comprised of at least one solid rocket motor and means is provided for igniting the second stage rocket motor subsequent to vehicle lift-off while the launch vehicle is within the earth's atmosphere in partially overlapping relationship with the first stage rocket motor prior to termination of first stage motor operation.

2. The launch vehicle of claim 1, wherein the first and second rocket motor stages are mounted generally parallel to one another.

3. The launch vehicle of claim 2, wherein the first stage comprises at least two diametrically opposed pairs of rocket motors having substantially similar thrust profiles.

4. The launch vehicle of claim 3, wherein at least one pair of said first stage rocket motor pairs comprises means for controlling launch vehicle yaw and pitch.

5. The launch vehicle of claim 4, wherein said means for controlling launch vehicle yaw and pitch comprises a thrust vector control system.

6. The launch vehicle of claim 3, wherein the first stage rocket motors are selectively jettisonable.

7. The launch vehicle of claim 3, wherein the first stage rocket motors are all solid fuel rocket motors.

8. The launch vehicle of claim 1, wherein the second stage rocket motor is ignited within about 5 seconds of termination of first stage rocket motor operation.

9. The launch vehicle of claim 1, further comprising means for effecting positive thrust control between ignition of successive rocket motor stages.

10. The launch vehicle of claim 1, wherein the rocket motors of the first and second rocket motor stages have substantially similar thrust profiles.

11. The launch vehicle of claim 10, wherein the rocket motors of the first and second rocket motor stages are Castor IVA solid rocket motors.

12. The launch vehicle of claim 10, wherein each of the rocket motor thrust profiles exhibits a generally linear rate of thrust diminution following attainment of maximum thrust until termination of motor operation.

13. The launch vehicle of claim 12, wherein maximum thrust is developed within about five seconds of rocket motor ignition.

14. The launch vehicle of claim 1, wherein the launch vehicle includes means for deploying a payload beyond the earth's atmosphere.

15. The launch vehicle of claim 14, wherein the payload comprises at least one satellite.

16. The launch vehicle of claim 14, wherein the payload deploying means effects deployment of the payload into orbit around the earth of from about 100 nautical miles to about 19,365 nautical miles above the earth's surface.

17. The launch vehicle of claim 14, wherein the payload deploying means effects deployment of the payload along a trajectory beyond geosynchronous orbit.

18. The launch vehicle of claim 14, wherein the payload has a weight at sea level of from about 150 lbs. to about 3,500 lbs.

19. A launch vehicle comprising three parallel rocket motor stages and means for sequentially igniting in partially overlapping relationship the second rocket motor stage with the first rocket motor stage while the launch vehicle is within the earth's atmosphere and the third rocket motor stage with the second rocket motor stage, said first rocket motor stage comprising at least two pair of diametrically opposed pairs of rocket motors positioned around the third stage rocket motor.

20. The launch vehicle of claim 19, wherein the first stage rocket motors comprise solid fuel rocket motors having substantially similar thrust profiles.

21. The launch vehicle of claim 19, wherein at least one pair of said first stage rocket motors comprises thrust vector control.

22. The launch vehicle of claim 21, wherein said second rocket motor stage comprises at least one pair of solid rocket motors having substantially similar thrust profiles and further including thrust vector control.

23. The launch vehicle of claim 22, wherein all of said first and second stage rocket motors are solid fuel rocket motors having substantially similar thrust profiles.

24. The launch vehicle of claim 19, wherein all of the rocket motors comprising the first, second and third stages have substantially similar thrust profiles.

25. The launch vehicle of claim 24, wherein each of the rocket motors develops a peak thrust of about 130,000 lbs.

26. The launch vehicle of claim 25, wherein each of the rocket motors develops its peak thrust within about 5 seconds following motor ignition.

27. The launch vehicle of claim 19, wherein said means for sequentially igniting said rocket motor stages is configured to effect ignition of said third rocket motor stage in overlapping relationship with said second rocket motor stage while the launch vehicle is within the earth's atmosphere.

28. The launch vehicle of claim 19, further comprising a payload having a weight at sea level of from about 150 lbs. to about 3,500 lbs.

29. The launch vehicle of claim 28, further comprising means for deploying said payload into an earth orbit of from about 100 nautical miles to about 19,365 nautical miles above the surface of the earth.

30. The launch vehicle of claim 29, wherein said payload deploying means comprises a liquid fuel rocket motor.

31. The launch vehicle of claim 28, further comprising means for deploying said payload along a trajectory beyond geosynchronous orbit.

32. A launch vehicle, comprising:
first and second sequentially ignitible, parallel-configured rocket motor stages, each of said rocket motor stages being comprised of at least one solid fuel rocket motor; and means for igniting said second rocket motor stage in partially overlapping relationship with operation of said first rocket motor stage following vehicle lift-off and prior to termination of first stage motor operation.

33. The launch vehicle of claim 32, wherein the rocket motors comprising the first and second rocket stages have substantially similar thrust profiles.

34. The launch vehicle of claim 32, wherein said first stage is comprised of two pairs of diametrically-opposed rocket motors, at least one of said motor pairs having means for controlling launch vehicle yaw and pitch.

35. The launch vehicle of claim 34, wherein said second stage is comprised of at least one pair of rocket motors, each of which is provided with means for controlling launch vehicle yaw and pitch.

36. The launch vehicle of claim 32, further comprising a third rocket motor stage mounted in parallel to said first and second rocket motor stages, said third rocket motor stage being ignitible so as to partially overlap operation of said second rocket motor stage.

37. The launch vehicle of claim 36, wherein said third rocket motor stage comprises a solid fuel rocket motor having a thrust profile substantially similar to the thrust profiles of the rocket motors comprising the first and second rocket motor stages.

38. The launch vehicle of claim 37, wherein the first and second rocket motor stages are arranged in a generally ring-shaped configuration that circumscribes said third rocket motor stage.

39. The launch vehicle of claim 32, further comprising means for deploying a payload beyond the earth's atmosphere.

40. The launch vehicle of claim 39, wherein the payload deploying means is adapted to deploy the payload into orbit around the earth of from about 100 nautical miles to about 19,365 nautical miles above the surface of the earth.

41. The launch vehicle of claim 39, wherein the payload deploying means effects deployment of the payload along a trajectory beyond geosynchronous orbit.

42. The launch vehicle of claim 39, wherein the payload has a weight at sea level of from about 150 lbs to about 3,500 lbs.

43. A method of operating a launch vehicle having at least first and second rocket motor stages, each stage comprising at least one solid fuel rocket motor, the method comprising the steps of:
igniting the rocket motors comprising the first stage and operating the rocket motors continuously until burn-out;
prior to first stage motor burn-out, igniting the motors comprising the second stage in overlapping relationship with the first stage motors so as to maintain positive thrust control over the launch vehicle as the first stage rocket motors burn-out; and
exerting directional control over the launch vehicle during burn-out of the first stage rocket motors.

44. The method of operating a launch vehicle according to claim 43, further comprising the step of jettisoning the first stage following burn-out of the first stage rocket motors.

45. The method of operating a launch vehicle according to claim 43, wherein the rocket motors comprising the second stage are ignited from about 3 seconds to about 5 seconds prior to burn-out of the first stage rocket motors.

46. The method of operating a launch vehicle according to claim 43, wherein the first stage rocket motors are operated to develop maximum motor thrust within about five seconds following motor ignition.

47. The method of operating a launch vehicle according to claim 46, wherein the second stage rocket motors are operated to develop maximum motor thrust within about five seconds following motor ignition.

48. The method of operating a launch vehicle according to claim 47, wherein the rocket motors of the first and second stages are operated at a generally linearly diminishing thrust rate following attainment of maximum thrust until burn-out.

49. The method of operating a launch vehicle according to claim 43, wherein the second stage comprises at least two rocket motors operable to provide substantially similar thrust profiles, wherein the second stage rocket motors are ignited substantially simultaneously and in partially overlapping relationship with the first stage rocket motors.

50. The method of operating a launch vehicle according to claim 43, wherein the second stage rocket motors are ignited while the launch vehicle is within the earth's atmosphere.

51. The method of operating a launch vehicle according to claim 43, wherein the launch vehicle further comprises a third rocket motor stage, the method further comprising the step of igniting the third stage rocket motor in partially overlapping relationship with the second stage rocket motors so as to maintain positive thrust control over the launch vehicle as the second stage rocket motors burn-out.

52. A method for deploying a satellite into orbit around the earth, the satellite being deployable from a launch vehicle having first and second sequentially ignitible, parallel mounted rocket motor stages, each of the rocket stages being comprised of at least one solid fuel rocket motor, the method comprising the steps of:
  igniting the first rocket motor stage and operating the first stage rocket motors continuously until motor burn-out;
  subsequent to lift-off and prior to first stage motor burn-out, igniting the second stage rocket motors in partially overlapping relationship with the first rocket motor stage so as to maintain positive thrust control over the launch vehicle as the first stage rocket motors burn-out;
  deploying the satellite into a desired orbital path around the earth; and
  exerting directional control over the launch vehicle until satellite deployment.

53. The method for deploying a satellite according to claim 52, further comprising the step of jettisoning the first rocket motor stage following burn-out of the first stage rocket motors.

54. The method for deploying a satellite according to claim 52, wherein the rocket motors comprising the second stage are ignited from about 3 seconds to about 5 seconds prior to burn-out of the first stage rocket motors.

55. The method for deploying a satellite according to claim 52, wherein the first stage rocket motors are operated to develop maximum motor thrust within about five seconds following ignition.

56. The method for deploying a satellite according to claim 55, wherein the first and second rocket motors are operated along substantially similar thrust profiles.

57. The method for deploying a satellite according to claim 56, wherein the thrust profiles exhibit a generally linearly diminishing thrust rate following attainment of maximum thrust until motor burn-out.

58. The method according to claim 52, wherein the launch vehicle further comprises a third rocket motor stage comprising at least one rocket motor, further comprising the step of igniting the third stage rocket motors prior to burn-out of the second stage rocket motors.

59. The method according to claim 52, further comprising the step of jettisoning the second rocket motor stage following second stage motor burn-out.

60. The method according to claim 52, further comprising the step of deploying the satellite into a predetermined earth orbit following shut-down of the third stage rocket motor.

* * * * *